Patented Dec. 24, 1940

2,226,106

UNITED STATES PATENT OFFICE 2,226,106

CORROSION INHIBITOR

William J. Ryan, Wilmington, and Marcus T. Kendall, Long Beach, Calif., assignors to The Texas Company, New York, N. Y., a corporation of Delaware No Drawing. Application February 24, 1939, Serial No. 258,170

2 Claims. (Cl. 148—8)

This invention relates to a composition of matter suitable for the prevention of corrosion such as occurs upon the surface of metals when removing undesirable films, as in the pickling of steel.

The invention broadly contemplates a corrosion inhibitor prepared from acid sludge produced in the treatment of petroleum or petroleum products with sulfuric acid under moderate conditions of treatment with respect to acid strength, acid dosage, and temperature of treatment.

More specifically, the invention comprises a corrosion-inhibiting material prepared from acid sludge obtained when treating hydrocarbon oil, such as a cracked petroleum naphtha, with sulfuric acid to remove inherent gum-forming constituents without substantial formation of higher boiling polymerization products.

A suitable inhibiting material may be prepared, for example, from the sludge produced when treating cracked petroleum naphtha with sulfuric acid containing around 10 to 60% $H_2SO_4$ at temperatures ranging from around plus 100° to minus 75° F.

In a pending application, Serial No. 148,256, June 15, 1937, filed by one of the present joint applicants, for Acid treatment of cracked distillates, and now matured into U. S. Patent No. 2,164,771, with a date of July 4, 1939, we have disclosed a method of acid-treating distillates obtained in the cracking of hydrocarbon oils with sulfuric acid containing around 55 to 60% $H_2SO_4$ at ordinary temperatures so as to remove inherent gum-forming constituents while avoiding the formation of higher boiling polymerization products.

It was found that an acid of this concentration, when employed at ordinary temperature, exerated a selective action so that it is possible to remove a substantial portion of the gum naturally present in the raw oil while avoiding the formation of polymerization compounds of higher boiling point than the gasoline constituents of the raw naphtha.

We have now discovered that the type of acid sludge produced when treating cracked naphtha in the foregoing manner is particularly useful as an inhibitor for preventing the corrosion of metals by aqueous liquids. This type of acid sludge is much more effective than the inhibitors already known in the art and produced from sludges formed in the conventional drastic acid treatment of hydrocarbon oils.

It is customary to treat cracked hydrocarbon distillates with sulfuric acid of about 66° Bé. gravity, and having an acid concentration of about 93% $H_2SO_4$.

The sludge produced by treatment in this way with concentrated acid is not completely miscible with the dilute acids with which it may be desired to employ the inhibitor as, for example, in the pickling of steel. The conventional type of sludge contains a considerable quantity of tarry material which is insoluble in dilute acid. As a consequence, it is necessary to process the conventional sludge before attempting to use it as a corrosion inhibitor in industry.

The acid sludge produced in accordance with our invention, on the contrary, is completely miscible with dilute acid. It requires no processing before using it as an inhibitor. Due to the absence of the undesirable tarry materials, it is more efficient so that smaller amounts are required.

By way of example, naphtha obtained in the cracking of oil derived from California crude was treated with sulfuric acid containing about 30% $H_2SO_4$, and at a temperature between 20 and 40° F. The sludge obtained by this treatment was found to be especially high in hydrocarbons containing nitrogen.

This sludge was completely miscible with dilute sulfuric or hydrochloric acid of about 10 to 20% concentration. A small quantity, i. e., about 0.5% by weight of this sludge was dissolved in dilute acid, and a specimen of clean boiler plate was submerged in the dilute acid for a period of three days. At the end of this period, the specimen was removed and exhibited substantially no corrosive effect.

A similar specimen of boiler plate was submerged in a similar quantity of acid of the same concentration but containing the same quantity of sludge produced when treating naphtha in the conventional manner with concentrated acid. At the end of three days, this specimen exhibited an appreciable corrosive effect, namely, about 5 to 10% of that exhibited by a specimen exposed to th same acid without any inhibiting material being present.

It is contemplated that sludge obtained from other fractions of petroleum, either cracked or uncracked, may be utilized where such sludge is obtained by subjecting the oil to a non-polymerizing treatment with the acid.

While we have described a non-polymerizing type of acid treatment, using acid containing 10 to 60% $H_2SO_4$ at temperatures ranging from about plus 100° to minus 75° F. it will be understood that the particular temperature employed will depend upon the particular concentration of acid used. Thus, with less concentrated acid, for example 10% acid, a temperature of around 100° F. may be used but with more concentrated acid, correspondingly lower temperatures must be employed so as to avoid substantial formation of the undesired polymerization compounds.

The inhibitor of this invention is thus adapted for inhibiting the corrosion of metals by aqueous liquids and may be added to such liquids in any amount desired, usually ranging from about 0.1 to 5% for example, in the case of dilute acids used in the pickling of steel.

Obviously, many modifications and variations of the invention, as hereinbefore set forth, may be made without departing from the spirit and scope thereof, and therefore only such limitations should be imposed as are indicated in the appended claims.

We claim:

1. A steel pickling bath containing an inhibitor for preventing corrosion of metals by dilute acids which comprises a pickling acid and a relatively small amount of acid sludge produced by acid-treating cracked petroleum naphtha with dilute sulphuric acid having a concentration of not in excess of about 60% $H_2SO_4$ and under non-polymerizing conditions of treatment such that the resulting solution is substantially free from tarry material, is completely miscible with dilute mineral acid of about 10 to 20% concentration, and is effective as an inhibitor without further treatment.

2. A steel pickling bath containing an inhibitor for preventing corrosion of metals by dilute acids which comprises a pickling acid and a relatively small amount of acid sludge produced by treating cracked naphtha derived from California crude with sulphuric acid having a concentration of about 30% $H_2SO_4$ and under non-polymerizing conditions of treatment, including a treating temperature of around 20 to 40° F., such that the resulting sludge is substantially free from tarry material, is completely miscible with dilute mineral acid of about 10 to 20% concentration, and is effective as an inhibitor without further treatment.

WILLIAM J. RYAN.
MARCUS T. KENDALL.